Dec. 17, 1929.  D. I. REITER  1,739,987
FASTENING DEVICE
Original Filed Aug. 16, 1926
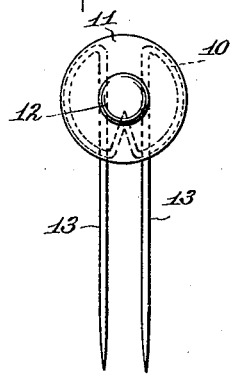
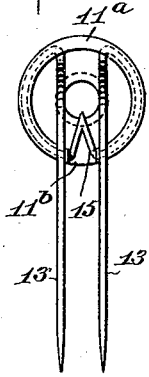
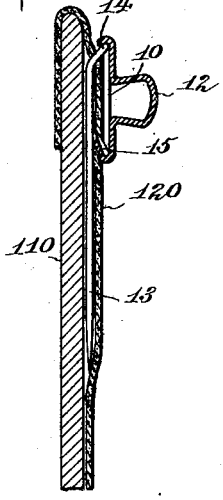
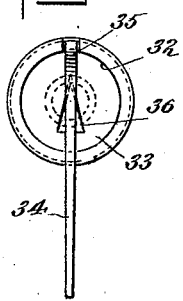
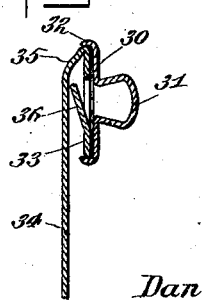
WITNESSES
INVENTOR
Daniel I. Reiter
BY
ATTORNEY Patented Dec. 17, 1929

1,739,987

UNITED STATES PATENT OFFICE

DANIEL I. REITER, OF BROOKLYN, NEW YORK

FASTENING DEVICE

Original application filed August 16, 1926, Serial No. 129,535. Divided and this application filed January 18, 1927. Serial No. 161,864.

The present invention is concerned with the provision of a fastening device which may have a wide range of utility in the arts, which is primarily adapted for securing dust covers to the upholstery of automobile seats and backs.

Since the advent of steel body construction in automobile vehicles, it has become common practice to secure the edges of the velour seat coverings between the steel body frame and a plate which is connected to the frame by concealed securing devices. These plates are generally of some hard substance unsuitable for the reception of nails or similar securing devices. In consequence the problem of attaching a dust cover such for instance as an ordinary cretonne cover over the upholstery has become a serious one. The covers themselves are cheap enough, but it is very difficult to find any way of attaching them.

In accordance with the present invention I have provided a fastening device adapted to be attached directly to the velour or to the outer covering of the upholstery, said fastening device carrying one element of a separable fastener, and the other element of the fastener being carried by the dust cover.

Preferably the fasteners which I utilize include pin portions adapted to pass through the velour and lie between the velour and the hard backing plate. Connected to the unpointed ends of the pins are plate portions which overlie the outer surface of the velour and carry either the male or female elements of snap fasteners. The pins are also formed with prongs which enter the velour and coact with the pins to prevent twisting or slipping of the fastening devices from proper position and prevent accidental withdrawal of the pins from the material into which the pins are inserted.

Objects of the invention are to provide a fastener of the general character outlined above which will be of simple, practical construction, rugged, durable and efficient in use, neat and attractive in appearance, and well suited to the requirements of economical manufacture and rapid installation.

This application is a division of my co-pending application Serial No. 129,535, filed August 16, 1926.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in front elevation of a fastening device embodying the present invention.

Fig. 2 is a view in rear elevation thereof.

Fig. 3 is a longitudinal sectional view through the fastener showing the same in applied position.

Fig. 4 is a view similar to Fig. 2, illustrating a further modification.

Fig. 5 is a vertical sectional view through the fastener of Fig. 4.

Referring first to Figs. 1 to 3 of the drawings, I have shown a fastening device which includes a length of wire bent to provide an intermediate head portion 10 of general circular shape adapted to snap into position under a flanged circular cap member 11 formed with one element of a separable fastener. This element has been shown as a stud 12 integral with the cap. The ends of the wire define spaced parallel pointed pin portions 13 lying parallel with the plane of the cap and of the head 10, the unpointed ends of the pins being offset as at 14 where they join the head 10. This offset or hump 14 is for the purpose of providing sufficient clearance between the cap and the pins 13 so that the pins may be inserted through a piece of fabric to their full length and the fabric not be bound or blocked by the engagement of the cap and the pins.

As above noted the pins and the circular head portion 11 are bent from a single length of wire and the intermediate portion of the head portion 10 which lies between the pins 13 is preferably bent at a sharp angle to define a rearwardly extending prong portion 15, the purpose of which will be more fully hereinafter described.

In Fig. 3 I have indicated at 110 a portion of the steel frame construction of an automobile body, to the face of which is secured a sheet of velour 120 or similar upholstering material. When applying the fastener, the pins 13 are inserted through the velour, entering the space between the velour and the frame 110. The prongs are inserted to their full length until further movement is arrested by the engagement of the hump or offset 14 with the velour. When the pins have been fully inserted, the prong 15 digging into the upholstering material, will effectively prevent accidental removal or retrograde movement of the pins 13. The head portion 10 and the cap which it carries will lie flatly against the surface of the velour, presenting the stud member 12 for engagement with a female fastener element carried by a detachable cover (not shown). It may be noted that the flange 11$^a$ of the cap 11 is cut away at 11$^b$ to accommodate the prong 15, this prong effectively preventing rotation of the cap 11 relatively to the head 10 as well as serving to prevent withdrawal of the pins.

In Figs. 4 and 5 I have shown a fastener which comprises a cap 30 integral with a stud element 31 and flanged at 32 to embrace a disc-like plate 33 integral at one edge with a pin or spear portion 34. The spear is offset from the disc 33 by a hump portion 35 and a retaining prong 36 is struck rearwardly from the body of the disc. The fastener of Figs. 4 and 5 functions substantially in the manner above described in connection with the fastener of Figs. 1, 2 and 3.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A double pointed pin fastener having a cap provided with a flanged rim, a double pointed pin having its head formed by bending over and humping its looped end and rigidly engaged by the flanged rim of the cap, and a spur formed by bending part of said head inwardly of the flanged rim.

2. A double pointed pin fastener having a cap and a double pointed pin having its head formed by bending over and humping its looped end and engaging the cap, and an upwardly and outwardly extending prong projecting from and integral with the looped end between the limbs of the pin.

3. A fastener element including a wire bent to provide at its intermediate portion a head, and at its ends a pair of parallel pin portions lying in a plane substantially parallel to and offset from the plane of the head, a flanged cap embracing the head, and a spur element bent from the wire and adapted to engage a piece of fabric through which the pins have been entered to prevent withdrawal of the fastener.

4. A fastener element including a wire bent to provide at its intermediate portion a head, and at its ends a pair of parallel pin portions lying in a plane substantially parallel to and offset from the plane of the head, a flanged cap embracing the head, and a spur element bent from the head and adapted to engage a piece of fabric through which the pins have been entered to prevent withdrawal of the fastener, said spur being arranged to prevent relative turning movement of the cap and head.

5. A fastener element including a wire bent to provide at its intermediate portion a head, and at its ends a pair of parallel pin portions lying in a plane substantially parallel to and offset from the plane of the head, a flanged cap embracing the head, and a spur element bent from the head at a point intermediate the pin portions and adapted to engage a piece of fabric through which the pins have been entered to prevent withdrawal of the fastener, said spur projecting upwardly and outwardly between the pins.

6. A fastener of the class described including a cap carrying a separable fastener element, a flange on the cap, a section of spring wire embraced by the flange, the ends of the wire projecting beyond the flanges and being pointed to constitute pins and the intermediate portion of the wire being offset to define a spur.

7. A fastener of the class described including a cap, flanges on the cap, a section of spring wire embraced by the flanges, the ends of the wire projecting beyond the cap in one direction and being pointed to constitute pins, and a section of the wire intermediate said ends bent into a projecting spur.

8. A fastener including a cap, a separable fastener element carried thereby, a peripheral flange on the cap, a member inserted into the cap and retained by the flange and including a pin or spear extending in one direction and a spur extending in the other direction.

9. In a pin fastener, a flanged member constituting a separable fastener element, and a second member inserted into the flanged member and held thereby, including an elongated pin extending beyond the flanged member in one direction, and including a spur within the periphery of the flanged member extending substantially in the opposite direction.

10. The combination with a circular member having a peripheral flange and an element of a separable snap fastener thereon, of a second member held to the first member by said flange and provided with an integral spur extending inwardly of the flange.

11. The combination with a member having an element of a separable snap fastener associated therewith, of a second member secured to the first member and provided with an integral inwardly extending spur.

12. The combination with a pin terminating in a head, a spur integral at both ends thereof with and bent from said pin for preventing accidental removal of the pin from the object through which it is inserted, and a cap member associated with and covering the head.

13. The combination with a double pointed pin terminating at the unpointed end thereof in a head, a spur integral with the head and directed away from the points of the pin and a circular covering member of a separate piece flanged about the head and having a diameter substantially equal to the greatest diameter of the head.

14. A pin having a head formed thereon, a projecting spur integral at both ends thereof with the pin, a covering member covering said head, the remainder of the pin exclusive of the head being offset from the plane of the head.

15. A pin having a cap engaging head at one end thereof, and a pointed member at the other end thereof, and a spur bent from and integral with a portion of the pin intermediate of said ends for entering the fabric through which the pointed member is inserted for preventing accidental withdrawal of the pin.

DANIEL I. REITER.